US005277070A

United States Patent [19]

Dorr

[11] Patent Number: 5,277,070

[45] Date of Patent: Jan. 11, 1994

[54] ULTRASONIC GAS FLOW MEASUREMENT METHOD AND APPARATUS

[75] Inventor: John A. Dorr, Crofton, Md.

[73] Assignee: Xecutek Corporation, Annapolis, Md.

[21] Appl. No.: 739,028

[22] Filed: Aug. 1, 1991

[51] Int. Cl.[5] .......... G01H 5/00

[52] U.S. Cl. .......... 73/861.28; 73/861.27

[58] Field of Search .......... 73/861.27, 861.28, 861.29, 73/861.31, 861.18

[56] References Cited

U.S. PATENT DOCUMENTS

| | | | |
|---|---|---|---|
| 2,669,121 | 2/1954 | Garman et al. . | |
| 2,911,826 | 11/1959 | Kritz . | |
| 2,993,373 | 7/1961 | Kritz . | |
| 3,050,997 | 8/1962 | Lake | 73/861.27 |
| 3,914,998 | 10/1975 | McShane . | |
| 3,964,308 | 6/1976 | Scarpa . | |
| 4,004,461 | 1/1977 | Lynnworth . | |
| 4,176,337 | 11/1979 | Aechter et al. . | |
| 4,183,244 | 1/1980 | Kohno et al. . | |
| 4,397,194 | 8/1983 | Soltz | 73/861.28 |
| 4,467,659 | 8/1984 | Baumoel | 73/861.27 |
| 4,515,021 | 5/1985 | Wallace et al. . | |
| 4,644,483 | 2/1987 | Lauer et al. . | |
| 4,754,650 | 7/1988 | Smalling et al. | 73/861.28 |
| 4,882,931 | 11/1989 | Breeuwer . | |
| 4,882,934 | 11/1989 | Leffert et al. . | |

*Primary Examiner*—Richard E. Chilcot, Jr.
*Assistant Examiner*—R. Biegel
*Attorney, Agent, or Firm*—Jim Zegeer

[57] ABSTRACT

A transit time gas flow meter comprising a pair of transducers mounted at an oblique angle to gas flow in a duct for measuring the transit time of an ultrasonic pulse in both directions between the transducers and computer determines the difference between transit times as a measure of the velocity of a gas stream flowing in the duct. Each transducer is carried in a mounting assembly which is comprised of a U-shaped frame member having a base and leg members and an ultrasonic reflection surface formed on the base of U-shaped frame member. A transducer is mounted between said legs and at a predetermined oblique angle to said reflection surface. A reference target carried on the U-shaped frame member is positioned at the edge of said gas and the ultrasonic transit time to each said reference target is subtracted by the computer means from the transit times from each of transducer to the other transducer, respectively, to zero flow calibrate transit time flow meter and to improve the accuracy measurements.

18 Claims, 7 Drawing Sheets

ULTRASONIC GAS FLOW MEASUREMENT METHOD AND APPARATUS

BACKGROUND AND BRIEF DESCRIPTION OF THE INVENTION:

The invention relates to gas velocity or flow monitors the transmit time of an ultrasonic pulse between an ultrasonic sender and receiver changes according to the velocity of the gaseous medium flowing between the sender and receiver.

Typically, a pair of ultrasonic transducers is mounted at an oblique angle to gas flow in a duct and on a common ultrasonic axis. The transducers operate as both senders and receivers and transit time measurements are made with and against the direction of flow so that factors affecting sonic velocity such as temperature, pressure, etc. are eliminated and, only the transit times, when the ultrasonic pulses are transmitted in the direction of flow and the sonic transit time against the direction of flow, are measured to determine gas velocity. These are denoted transit time flow meters as opposed to ultrasonic measurements which are based on Doppler effect.

The object of the present invention is to provide an improved transit time gas flow meter which is more accurate, easier to install and of lower cost.

In particular, an object of the invention is to provide a transit time ultrasonic measuring system for measuring gas flow which may be calibrated for zero flow bias. Further, a feature of the invention is that the up stream and down stream ultrasonic transducer reflector assemblies incorporate acoustically reflective surfaces which are easily mounted in acoustic view of each other. The upstream and downstream transducer assemblies incorporate a rectangular housing which includes a mounting bracket for orienting a transducer, particularly a low-cost narrow beam electrostatic transducer of the Polaroid®-type which are pre-oriented relative to a Teflon® coated reflective surface and includes a reference wire target which is positioned at the edge of the flow path of the gas being monitored. While the reference targets could advantageously be located along the acoustic axis of the reflective surfaces and the transducers, it preferably is located at the edge of the respective reflectors so that it is out of the path of any side lobes of the transducer and, even though it may not be in the right place, since it is a known distance, the signal microprocessor can easily attend to the fact that it is not on the acoustic axis. The reference targets provide for increased accuracy in flow measurement and zero flow calibration of the instrument.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1A:
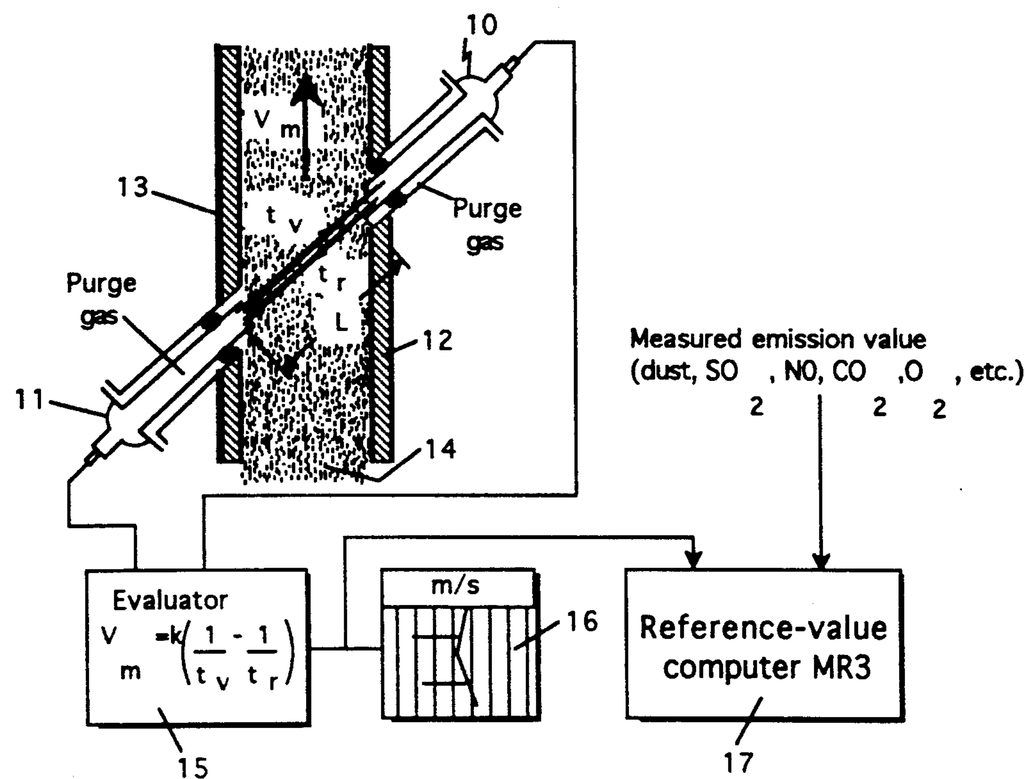
FIGS. 1*a* and 1*b* are illustrations of prior art transit time monitors.

Referring to the prior art illustrated in FIG. 1*a*, ultrasonic transducers 10 and 11 are mounted on a common canted acoustic axis in the sidewalls 12 and 13 of a gas flow duct 14 and have a distance L between the transducers defining the path through the moving fluid medium whose velocity V is to be measured. Evaluator 15 solves the equation:

$$V_m = K\left(\frac{1}{T_v} - \frac{1}{T_r}\right)$$

where K is a constant that results from the mounting geometry and used to calibrate the evaluator, $T_v$ is the ultrasonic pulse transit time in the flow direction, and $T_r$ is the sonic transit time against flow. The signals from the evaluator are supplied to a recorder 16 which may include a strip chart recorder and to a computer 17 which receives measured emission values of dust, $SO_2$, NO, $CO_2$, $O_2$, etc.) and computes the quantities of dust, $SO_2$, NO, etc. which are flowing in the flue gas duct 14. A source of purge gas is supplied to each of the transducer assemblies 10 and 11 to provide protection against contamination.

Figure 1B:
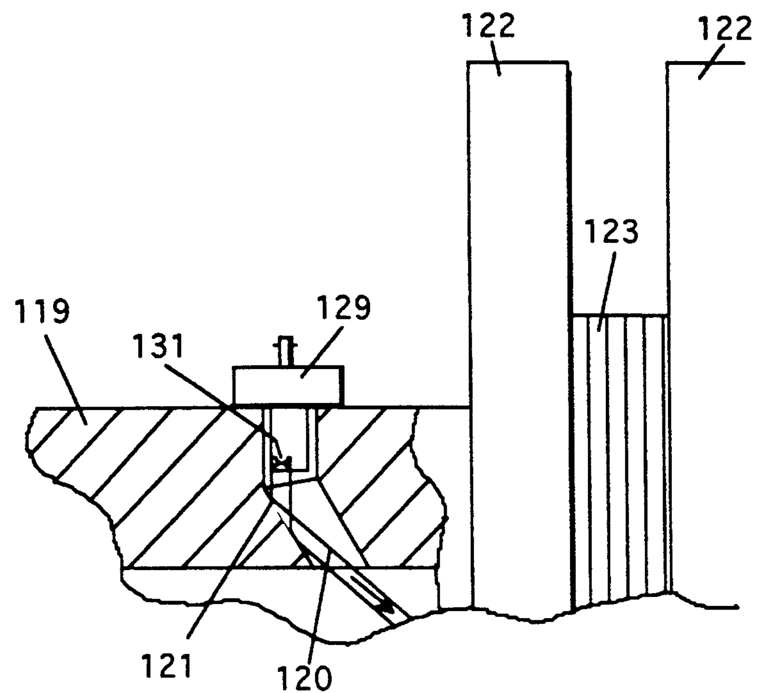
Figure 10:
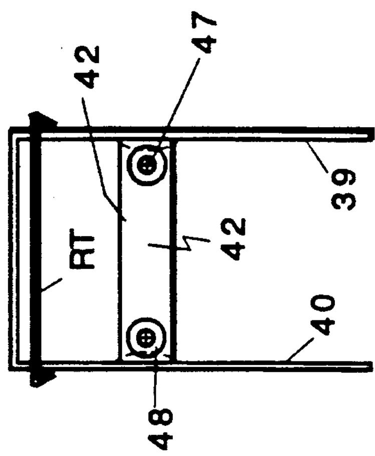
Figure 8:
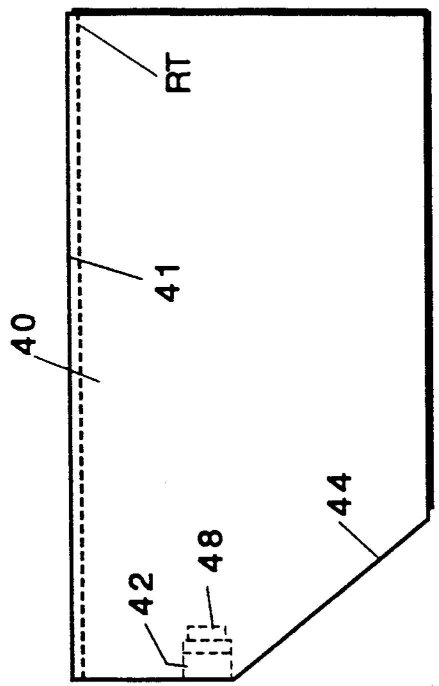
Figure 9:
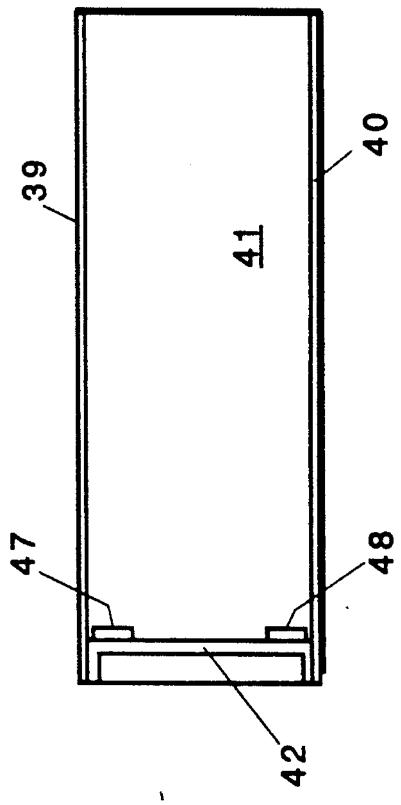

In the prior art device shown in FIG. 1*b* (which is FIG. 10 of Lynnworth U.S. Pat. No. 4,004,461), a holder 129 mounts a transducer 131 whose axis is parallel to the opposing transducer on the opposite side (not shown in FIG. 1*b*) and the direction of the transducers are in a radial direction in first bore holes 119. Each transducer assembly includes an oblique second bore hole 120 which is machined with its axis at 22.5 degrees to the radial direction so that the radially incident beam of the transducers are reflected along an inclined path at 45 degrees to the axis of the thick walled pipe 119 and is reflected off of a flat reflecting face 121. The transducers are mounted in separate portions which have flanges 122 joined together by bolt means and the space between the gaps has a series of gaskets 123 interposed between the flanges and these gaskets are formed of low acoustic impedance material to provide an acoustic mis-match for the conduit walls 119. One asserted advantage of the assembly shown in FIG. 1*b* is that the use of separate pipe sections for the transmitter and receiver transducers permits certain machining operations be performed and permits the transducer holders to be mounted in a radial orientation and yet provide an oblique interrogation path at an angle which is substantially immune to sound speed changes in the fluid.

THE PRESENT INVENTION

Figure 2:
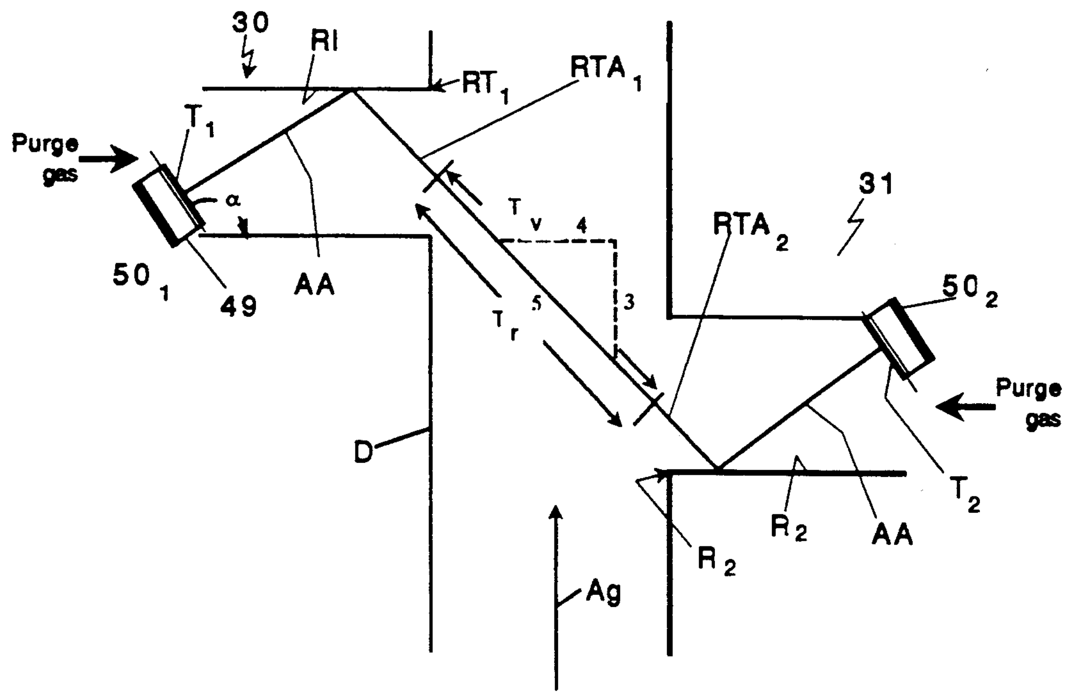
FIG. 2 is a schematic diagram illustrating the present invention.

Referring now to the diagrammatic illustration in FIG. 2, a pair of substantially identical transducer/reflector assemblies 30 and 31 have been dimensioned to reflect the 3-4-5 right triangle relationship shown in the drawing so as to permit relative ease of alignment and installation. Each transducer/reflector/reference target assembly include a transducer $T_1$ which, in a preferred embodiment, are narrow beam Polaroid® electrostatic transducers but which may be piezoelectric transducers, and the like, and are mounted at an angle ($\alpha$) relative to a horizontal and thus has its acoustic axis AA oriented to reflect off of a reflecting surface $R_1$ which is perpendicular relative to the direction of flow of gases denoted by arrow AG and, with reference to the reflective surface R2 associated with the transducer $T_2$ so as to satisfy the 3-4-5 right triangular relationship for the simplified installation process. Reference targets $RT_1$ and $RT_2$ may be located along the acoustic axis and at the edge of the flow path boundary for the gases flowing in duct D at alternative reflector reference target positions $RTA_1$ and $RTA_2$. Since these positions ($RTA_1$ and $RTA_2$) may be impinged by a side lobe from each of their respective transducers $T_1$ and $T_2$, a preferred position for these reference targets $RT_1$ and $RT_2$ are at the edge of the reflectors $R_1$ and $R_2$ and just at the edge of the flow stream of flowing gas in duct D. (These wire reference targets may even be slightly in the flow path beyond the edges of the duct D.) In this position, the improved accuracy and calibration for zero flow conditions utilizing the targets $RT_1$ and $RT_2$ can be accomplished without concern for affects of side lobe signals or pulse energy emanating from the transducers $T_1$ and $T_2$.

It will be noted that the up and downstream acoustically reflective surfaces $R_2$ and $R_1$, respectively, are in optimum unobstructed ultrasonic view of each other because of the three, four, five right triangular relationship discussed above.

Figure 3:
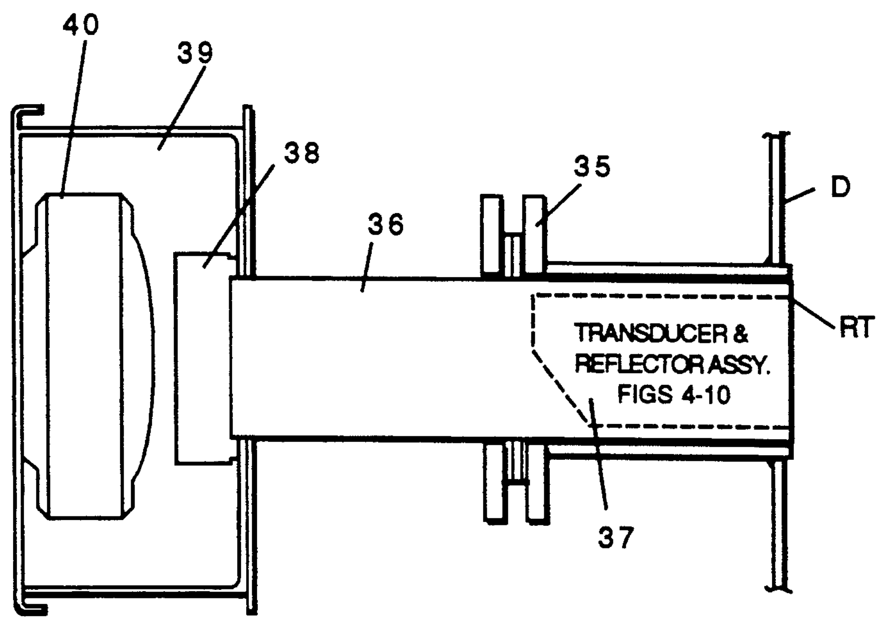
FIG. 3 is a sectional view of one transducer arrangement mounted in an existing flue-gas attachment.

Referring now to FIG. 3, the invention is shown as applied to a duct D, a circular tube 36 carrying the transducer, reflector and reference target assembly 37 is supplied with purge gas from a pancake or muffin fan 38 which has a plenum chamber 39 having an air filter 40 for receiving and filtering ambient air or other purge gas, if desired. It will be appreciated that while pipe 36 is shown as being circular, it could be rectangular and conforming to the rectangular shape of the transducer and reflector assembly 37.

Figure 5:
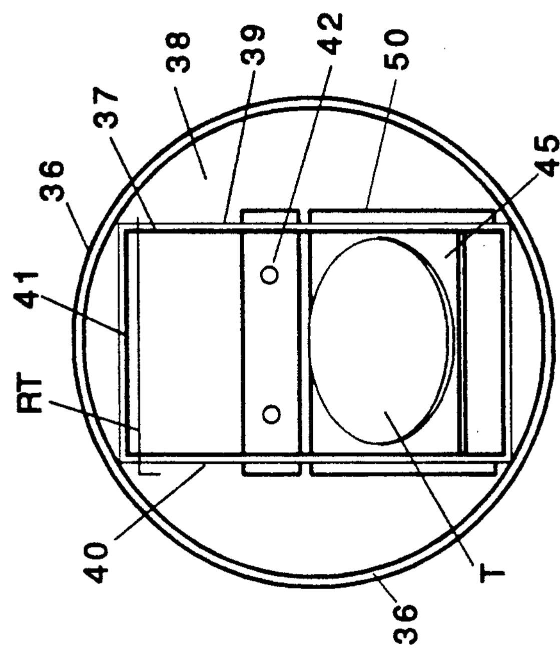
FIGS. 4–10 are views of the transducer and reflector assembly incorporating the invention.
Figure 4:
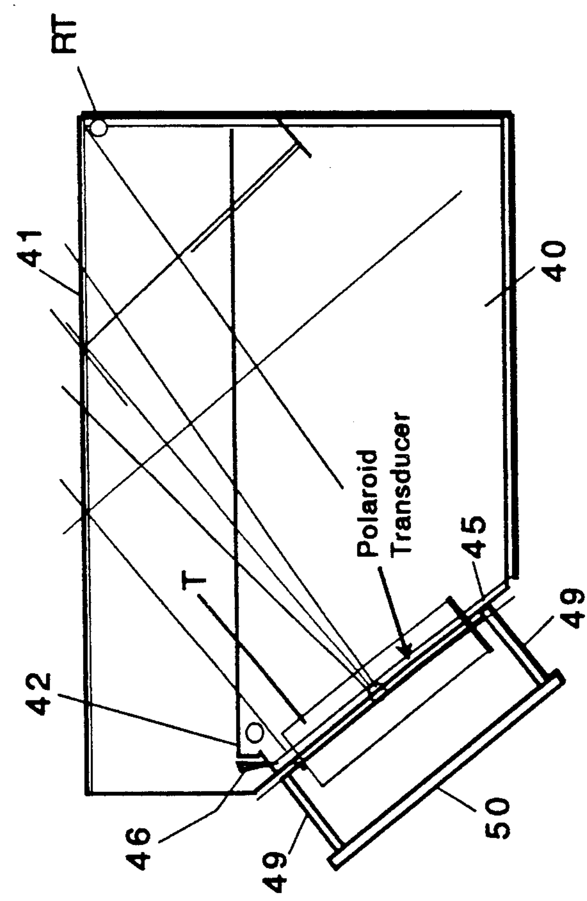
Figure 7:
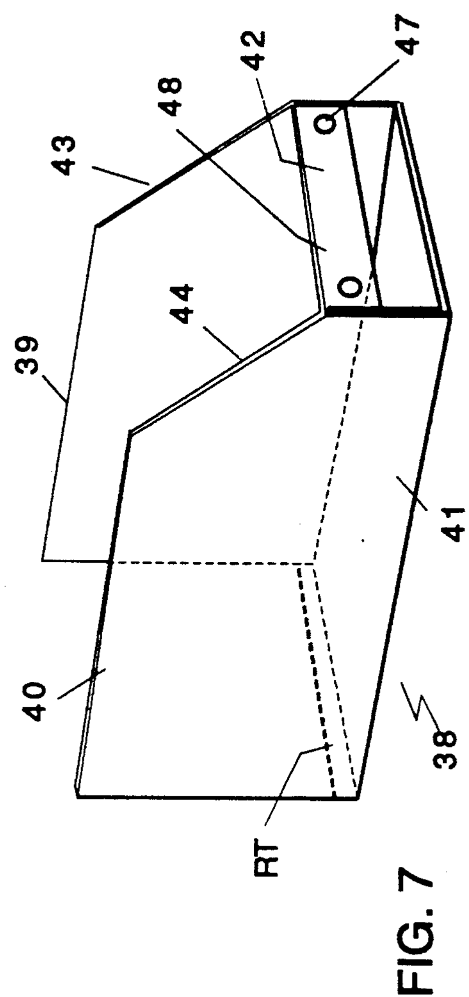

The transducer and reflector assembly is shown in detail in FIGS. 4–10 with FIG. 4 being a side elevational view and FIG. 5 being an end view looking inwardly through the end of pipe 36. Dimensions shown are purely exemplary.

Figure 6:
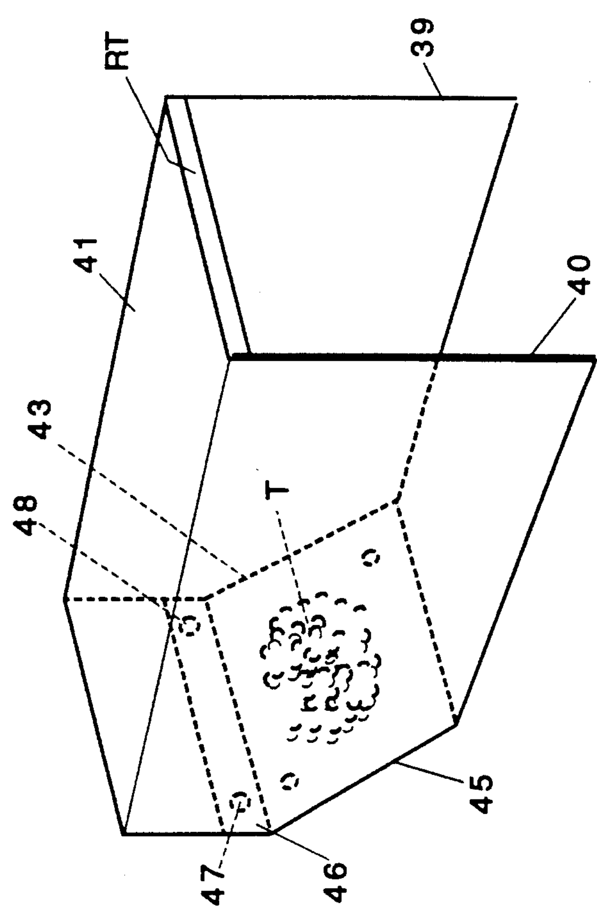

The transducer and reflector assembly 37 includes a U-shaped frame 38 having sidewalls or legs 39 and 40 joined by a reflector wall or base 41, and a transducer mounting plate strap 42 which is welded between sidewalls or legs 39 and 40. Sloping edges 43, 44 define the angular orientation of the acoustic axis of the transducer T relative to the reflecting surface 41. As shown in FIGS. 4 and 6, a transducer mounting plate 45 has an angular member 46 which is bolted through bolt holes 47, 48 in cross member 42. Stand-off posts 49 space the TR switch preamplifier printed circuit board from the transducer T1. U-shaped frame 38 is preferably made of stainless-steel and at least the reflecting surface 41 is coated with a non-stick polymer such as Teflon® (PTFE) and the interior side surfaces 39–40 may likewise be coated with the same non-stick material to minimize contamination thereof and reduce maintenance.

It will be appreciated that high velocity flue and stack gases, for example, will be flowing in the duct D and therefore in addition to purge gas flow will create negative pressure in the pipe 36 causing out flow but that there will be eddys and turbulences in the pipe so that even with this negative pressure and the purge gas, there still may be particles of materials which could stick to these surfaces and, the non-stick coating of Teflon® (PTFE) minimizes the sticking.

Each of the transducer and reflector assemblies includes or supports a reference target RT which is used in accordance with the invention in order to enhance accuracy and establish zero flow calibration. As discussed above, these reference targets are positioned at the lateral boundaries or edges of the fluid flowing in the duct D and optionally along the acoustic axis thereof. However, since the transducers $T_1$ and $T_2$ are mounted at angles relative to the reflector surface 41, positioning of these reference target reflectors on the acoustic axis, as for example, at position designated $RTA_1$ and $RTA_2$ in FIG. 2, side lobes may be impinged upon these reference targets and hence, in a preferred practice of the invention, they are positioned at the end of the reflectors $R_1$ and $R_2$ and just at the edge of the flow stream of the gas flowing in duct D. In this situation, a slight proportionality correction is entered when the computation is made for zero flow calibration and for the ultrasonic transit times between the transducers.

These reference targets RT are comprised of stainless-steel wires or rods which have preferably been coated with non-stick material such as Teflon® (PTFE) and preferably in the same coating operation as done with the ultrasonic reflectors surfaces $R_1$ and $R_2$. These wires or rods are mounted in small apertures or bores at the ends of the sidewalls 39 and 40, respectively.

At this point it should be noted that these reflector reference targets do not perform the same function as in those cases where a reference target is utilized for purposes of establishing temperature compensation and the like. In the present case, since there is a transmission of the ultrasonic signal in the direction of flow and in the opposite direction, the equation eliminates factors affecting sonic velocity such at temperature, pressure, and the like. In the present invention the reference targets RT are used to provide zero flow calibration and to improve the accuracy of the measurements, particularly for smaller dimensioned flow ducts D.

Figure 11:
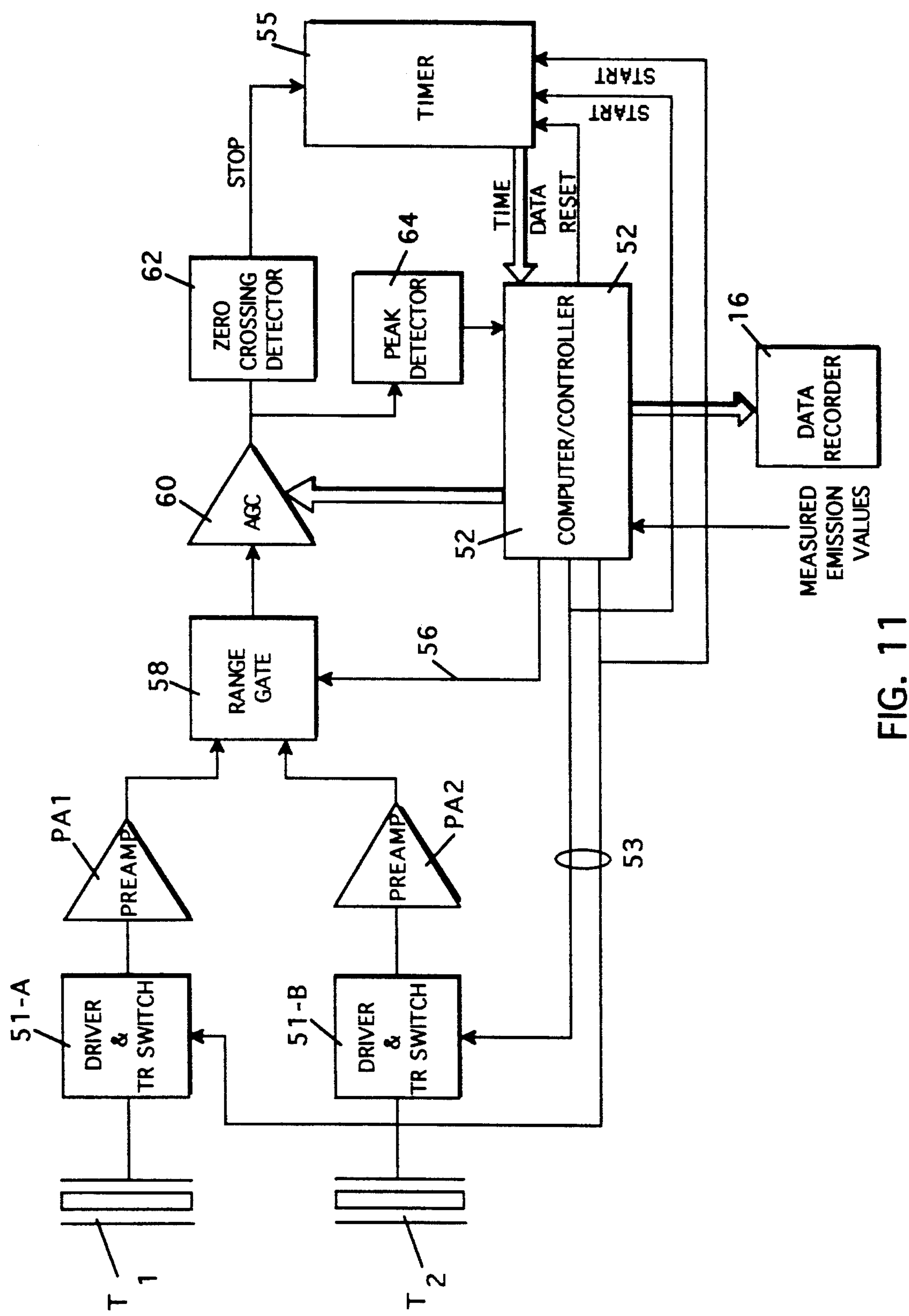
FIG. 11 is a block diagram of the electronic circuitry incorporated in the invention.
Figure 12:
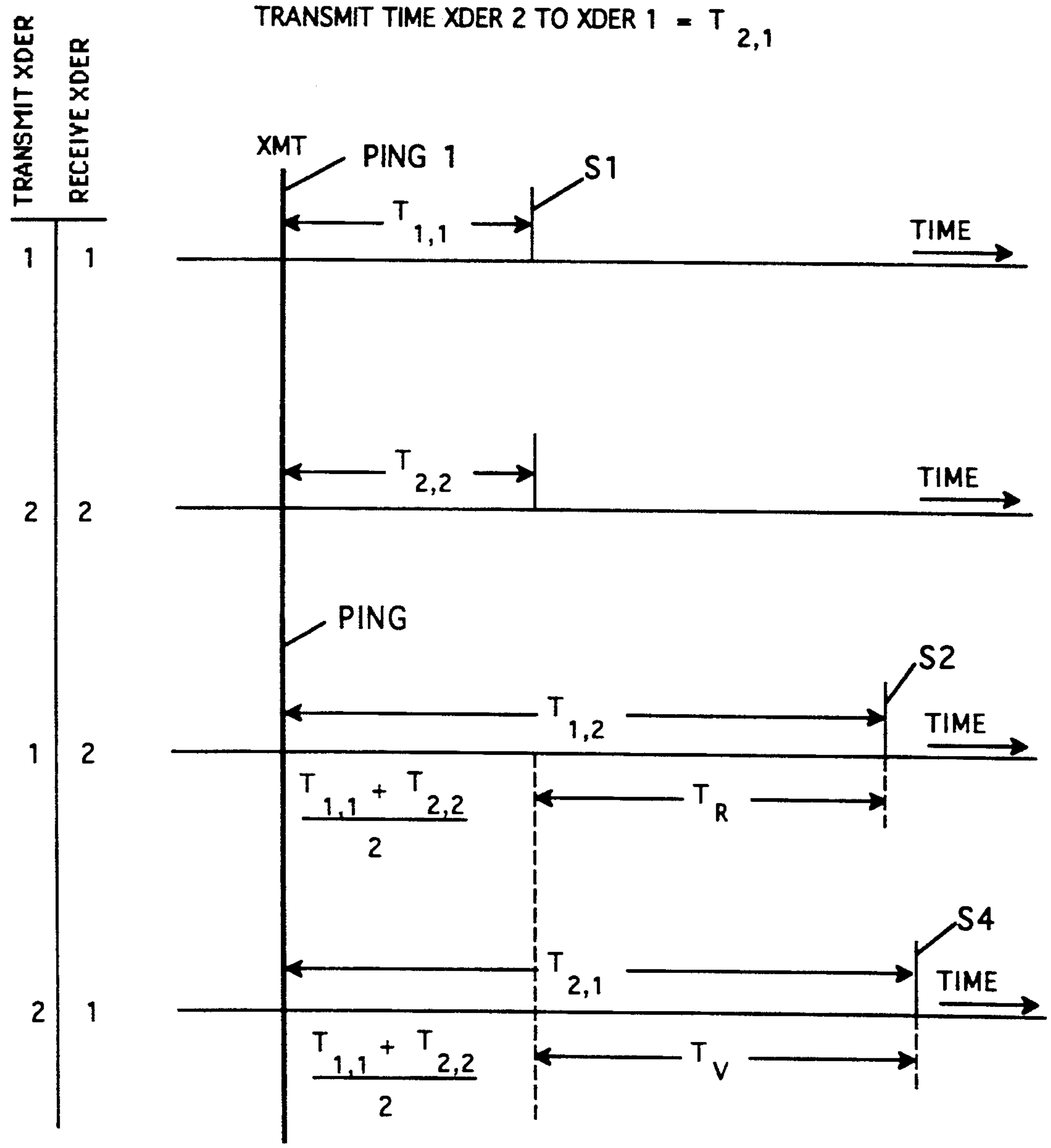
FIG. 12 is a simplified graph showing the transmission and reception signals of the two transducers.

Referring now to the block diagram of FIG. 11 and the graph of FIG. 12, transducers $T_1$ and $T_2$ are alternately activated with about a 50 kHz signal pulse via transmit/receive and driver networks 50 and 51 which, in turn, are controlled by control signals on channels 53 by computer (microprocessor) controller 52. First, a signal is transmitted to get the echo time reference $T_{1,1}$ and $T_{2,2}$ to the reference targets $RT_1$ and $RT_2$ and this is done by transmitting a pulse or ping and, at the same time, this signal is supplied to start the timer 55. Also, a signal on line 56 from computer controller 52 is applied to range gate 58 so as to open the range gate quickly so that the signals from the reference targets $RT_1$ (or $RT_2$) via the preamplifiers $PA_1$ and $PA_2$ can pass. Because of the relative shortness of the distances, the reflection from the reference targets comes back very quickly. The signals from the range gate 58 are supplied to automatic gain control circuit 60 which has been previously set by signals from computer controller 52 to the correct level so that the zero crossing detector 62 works from the right phase of the signal coming back and the signal from the zero crossing detector 62 is supplied to the timer 55 to stop the timer. This is time to and from the reference target and is divided up by 2 to get the time measurement to the reference target. It should be kept in mind that half of the time is on one side e.g., associated with one reference target and transducer, and the other half is on the other side e.g., associated with the other reference target and transducer, so the average of these two time intervals $T_{1,1}$ and $T_{2,2}$ (the time intervals to the two reference targets $RT_1$ and $RT_2$) are then subtracted from the total time, either the upstream traverse or the downstream traverse (against the flow or with the flow), for enhancement of accuracy.

The AGC circuit 60 supplies the signal to the peak detector 64 which indicates whether or not there is a detection. If there is no detection, the computer controller 52 increases the gain or if there is a detection then it may decrease the gain and the computer is programmed to allow it to get up gain fast and to stabilize. It should be noted that there are four different gain numbers that are stored, one for each of the transducers and one for each of the reference targets. In the preferred embodiment, transducer $T_1$ and $T_2$ are not operated simultaneously but alternate in sequence so that the circuits from the range gate circuitry to the timer can operate in multiplex fashion. However, it will be appreciated that a separate circuitry can be utilized for each of the transducers which are controlled by a common computer or data processor. The computer controls the application of the control signals to the range gates in this case. It can also perform the timer functions as well, if desired.

The time is measured to each of the reference targets on each transducer and those times are compared. This is essentially a comparison of the phase response of the two transducers and for extreme accuracy and for zero flow bias, the output of the flow meter when there is no flow is a function of the difference in the phase response of the two receiving systems. This means that when the electronics are time shared or multiplexed, the receiving electronics are time shared as much as possible to get any imbalance in the phase response out of the system. However, there is always left the transducer and the transmit/receive circuit and the preamplifier associated therewith. Thus, to that extent, the phase response of one transducer amplifier combination is different from the other there will be an equivalent $\Delta T$ or time difference when there is no flow. The reference targets therefore allow the determination of this $\Delta T$ while the machine is operating and allows the computer to assess the difference in phase responses when the temperatures are the same. That is, when the purge temperatures are the same and which they will be approximately. Alternatively, purge air temperatures may be measured and used to correct $\Delta T$ . This permits the apparatus to comply with the EPA requirements that the apparatus have a zero flow calibration feature. With the references targets of this invention, the apparatus is able to give a true reading of the relative phase stability between the two systems of the electronics that were used differently in the upstream and downstream phases and it allows the system to test itself.

In the time graph shown in FIG. 12, the initial ping of transducer $T_1$ is illustrated at $P_1$ and the reflection or echo by the reference target $RT_1$ as received by transducer $T_1$ is indicated as $S_1$. The next signal received by transducer $T_2$ is the signal $S_2$ from transducer $T_1$. The range gate has been opened a to allow each signal to pass. The main transducer ping $P_2$ is indicated for transducer $T_2$ and the range gate is opened to allow the reference target $RT_2$ echo $S_3$ to be received by transducer $T_2$. The next signal time the range gate is opened is to allow the signal $S_4$ received by transducer $T_1$ to pass. The computer controller 52 performs the calculations discussed above, and at the same time, subtracts one-half of the time interval from $T_1$ to $RT_1$ and one-half of the time interval from $T_2$ to $RT_2$ to arrive at $T_r$ and $T_v$ transit times and perform the flow velocity calculations.

This use of the reference targets $RT_1$ and $RT_2$ in the calculation of the transit times becomes more significant the smaller the pipe or duct D so that the smaller the pipe the larger or more significant becomes the measurement to the reference targets $RT_1$ and $RT_2$ and their use in arriving at a more accurate measurement of the velocity of the flow of gases in duct D.

The zero flow calibration should derive the zero flow time difference from the times to the reference targets $RT_1$ and $RT_2$. However, temperature compensation would be required for best accuracy in measurements to the reference targets and thus a temperature measurement capability could be incorporated into the system, but not necessarily to the practice of the invention.

While there has been shown and described preferred embodiments of the invention, it will be appreciated embodiments and adaptations of the invention will become readily apparent to those skilled in the art and is intended to encompass such obvious modifications and adaptations within the spirit and scope of the claims appended hereto.

What is claimed is:

1. In a transit time gas flow meter comprising a pair of transducers mounted at an oblique angle to gas stream flow in a duct for measuring the transit time of an ultrasonic pulse in both directions between said transducers and computer means for determining the difference between said transit times as a measure of the velocity of a gas stream flowing in said duct, the improvement comprising,

- a mounting assembly for each of said transducers, each said mounting assembly including an elongated U-shaped frame member having a base and leg members, an ultrasonic reflection surface formed on said flat base member, means for mounting one of said pair of transducers between said sidewall members and at a predetermined angle to said ultrasonic reflection surface formed on said base member, a zero flow calibration target,
- means forming upstream and downstream openings in said duct, and
- means for supporting and positioning a mounting assembly in each one of said openings, respectively, on said duct with said zero flow calibration target at the boundary edge of said gas stream flowing in said duct and the sonic path between said ultrasonic reflection surface defining said oblique angle.

2. The transit time gas flow meter defined in claim 1 wherein the ultrasonic transit time to each said zero flow calibration target is subtracted by said computer means from the transit times from each of said transducers to the other transducer, respectively, to zero flow calibrate said transit time flow meter.

3. The transit time gas flow meter defined in claim 1 wherein said zero flow calibration target is positioned at the edge of said ultrasonic reflection surface.

4. The transit time gas flow meter defined in claim 2 wherein said zero flow calibration target is positioned on the acoustic axis of said ultrasonic reflection surface.

5. The transit time gas flow meter defined in any one of claims 2-4 and 1 wherein each said ultrasonic reflection surface is coated with a non-stick PTFE polymer.

6. The transit time gas flow meter defined in any one of claims 2, 3 or 4 wherein each said zero flow calibration target is coated with a non-stick PTFE polymer.

7. In a transit time gas flow meter comprising a par of transducer means mounted at an oblique angle to gas stream flow in a duct for measuring the transit time of an ultrasonic pulse in both directions between said transducer means and computer means for determining the difference between said transit times as a measure of the velocity of a gas stream flowing in said duct, the improvement comprising,

- a mounting assembly, a transducer carried by the mounting assembly, each mounting assembly comprising a frame member having sidewalls and a flat base and a transducer support member, an ultrasonic reflection surface formed on said base, means for securing said transducer and said transducer support member at a predetermined angle to said ultrasonic reflection surface,
- means forming upstream and downstream openings in said duct at opposing sides thereof,
- a zero flow calibration target positioned at the boundary edge of the gas stream flowing in said duct
- means for mounting and positioning each of said frame members in said openings at opposing edges, respectively, of said gas stream flowing in said duct so that the said ultrasonic reflection surfaces are aligned along said oblique angle.

8. The transit time gas flow meter defined in claim 7 wherein said predetermined acoustic axis is at an angle to the direction of flow in said duct such that said acoustic axis is aligned with the hypotenuse of a 3, 4, 5 right triangle to simplify and facilitate installation thereof on said duct.

9. The transit time gas flow meter defined in claim 7 wherein each of said mounting assemblies include a zero flow calibration target which is at the edge of said gas stream when said mounting assembly is mounted on said duct.

10. The transit time gas flow meter defined in claim 9 wherein said zero flow calibration target is substantially on said acoustic axis.

11. The transit time gas flow meter defined in claim 7 wherein said zero flow calibration target is positioned at the edge of said reflector surface.

12. The transit time gas flow meter defined in any of claims 7, 8, 9 or 11 wherein said zero flow calibration target is a wire coated with PTFE polymer.

13. In a transit time gas flow meter comprising a pair of transducers, each said transducer being spaced from the boundary edges and on opposite sides of, and at an oblique angle to flow of a gas stream in a duct, respectively, means for measuring the transit time of an ultrasonic pulse in both directions, respectively, between said transducers and computer means connected to said transducers for determining the difference between said transit times as a measure of the velocity of gas stream flowing in said duct, said duct defining the boundary edges of said gas stream, the improvement comprising:

- a zero flow calibration target for each of said transducer, and means positioning one of said zero flow calibration targets at a boundary edge, respectively, of said gas stream and a predetermined distance from its associated transducer, said computer means being programmed to subtract the sonic transit times to said zero flow calibration targets from their respective transducers from the sonic transit times between said transducers.

14. The transit time gas flow meter defined in claim 13 wherein each said zero flow calibration target is located on the acoustic axis between transducers.

15. The transit time gas flow meter defined in claim 13 including a sonic reflector for each of said transducers, each sonic reflector being located between its respective transducer and said boundary edge of said gas stream flowing in said cut means orienting the acoustic axis of said transducers at an predetermined angle relative to said sonic reflectors, respectively, and a path defining the acoustic axis between said reflectors which is at said oblique angle to the flow of a gas stream in said duct.

16. In a transit time gas flow meter comprising a pair of transducers, said transducers being spaced from the boundary edges and on opposite sides of, and at an oblique angle to flow of a gas stream in a duct, means for measuring the transit time of an ultrasonic pulse in both directions, respectively, between said transducers and computer means connected to said transducers for determining the difference between said transit times as a measure of the velocity of gas stream flowing in said duct, said duct defining the boundary edges of said gas stream, the improvement comprising:

- a zero flow calibration target for each of said transducer, and means positioning one of said zero flow calibration targets at a boundary edge, respectively, of said gas stream and a predetermined distance from its associated transducer, said computer means being programmed to subtract the sonic transit times to said zero flow calibration targets from their respective transducers from the sonic transit times between said transducers,
- a sonic reflector for each of said transducers, each sonic reflector being located between its respective transducers and said boundary edge of said gas stream flowing in said duct, means orienting the acoustic axis of said transducer at a predetermined angle relative to said sonic reflectors, respectively, and a path defining the acoustic axis between said reflectors which is at said oblique angle to the flow of a gas stream in said duct wherein each said reference target is located at an end of an associated sonic reflector surface.

17. The transit time flow meter defined in claim 16 wherein said zero flow calibration target is located on the acoustic axis between said reflectors.

18. The transit time flow meter defined in claim 16 wherein said reference target is at the edge of its respective sonic reflector.

* * * * *